Oct. 11, 1955     J. C. CLARKE     2,720,013
INSECTICIDE DISPENSER
Filed Nov. 2, 1953

INVENTOR.
JUDITH C. CLARKE
BY John T. Bachoff

2,720,013
INSECTICIDE DISPENSER

Judith C. Clarke, Baton Rouge, La.

Application November 2, 1953, Serial No. 389,771

6 Claims. (Cl. 21—126)

This invention relates to an improvement in insecticide dispensers and more particularly, but not exclusively, concerns those useful for household or industrial use to distribute an insecticide in rooms and other enclosed spaces.

At the present time, most insecticides are dispensed as a solution, normally in the very dilute concentration of only about 3–5 percent, and dispensed with a sprayer, an aerosol bomb, or the like. Essentially no use is made of insecticides in solid or concentrated form due to their relatively low rates of vaporization at normal temperatures and the toxicity of their concentrated vapors. Solvent solutions of insecticide have many disadvantages in use, the main ones involving the disagreeable odors associated with the solvent and the tendency of the solution to soil fabrics, walls and other articles with which it contacts. In addition, many solvents are flammable and are accordingly dangerous.

Thermal dispensers, such as those in which a cake of insecticide is heated by a candle or by contact with an electric bulb, have other disadvantages. The more serious of these include the great danger to humans of vapors of these toxic materials in the concentrations formed at the temperatures employed. Accordingly, when used, the space treated must be evacuated for a considerable period of time and the treated space thereafter completely ventilated prior to use to remove the insecticide vapors. Such treatment results in the elimination of insects originally present in the treated space but gives no appreciable residual benefit.

It is accordingly an object of this invention to provide an improved means for dispensing insecticides. Another object is to provide a means for dispensing insecticides without employing odoriferous and otherwise undesirable solvents for the insecticidal material, and at the same time is adapted to distribute vapors of the insecticide uniformly in a space to be treated in a safe but effective concentration. Another object is to provide an insecticide dispenser of the above type which can be easily used and reused and which is characterized by its economy in operation. Other objects and advantages will become apparent from the following description and appended claims, reference being had to the drawings herein in which:

The insecticide dispenser of this invention comprises a fan having a portion of a solid insecticide secured to the blades thereof, and adapted to effect evaporation of the insecticide and uniform distribution of the insecticidally active vapors with the air currents generated during operation thereof. In the preferred embodiment of this invention, the solid insecticide is secured, impregnated or otherwise affixed to a flexible carrier member, which is, in turn, adapted to be secured to the blades of a fan by an adhesive or similar means. Preferably, the carrier member is a porous sheet of fabric and is provided with the insecticide on one surface and an adhesive on its opposite surface. In use, the adhesive side of the carrier member is pressed onto each blade or, at least, opposite blades of the fan, generally being wrapped around the leading edge of the blade.

Figure 1:
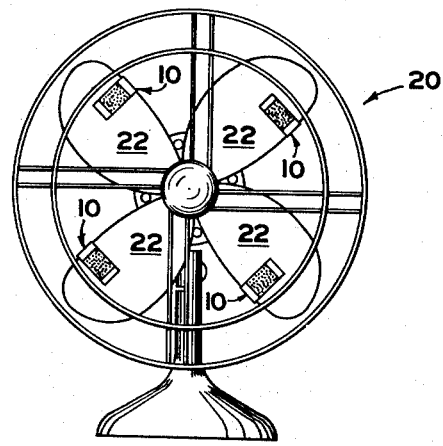
Fig. 1 is a front elevational view of an insecticide dispenser embodying the features of this invention.
Figure 2:
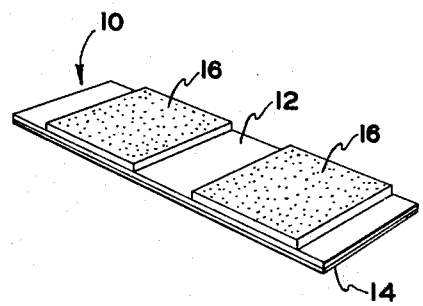
Fig. 2 is a perspective view of an insecticide carrier member adapted to be secured to the blades of a fan.

With particular reference to the drawings, an embodiment of this invention is illustrated wherein a plurality of insecticide carrier members 10 are shown in Fig. 1 secured to the leading edges of blades 22 of a fan 20. Each of the carrier members 10 have a flexible backing member 12 (see Fig. 2), an adhesive coating 14 covering one side of the flexible backing member, and a solid insecticide 16 pressed onto or otherwise secured to the opposite side of the flexible backing member 12. The flexible backing member 10 is preferably formed from a porous fabric material to permit the insecticide to be pressed or fused into the body of the material. However, if desired, other materials such as plastic, rubber and the like can also be employed.

The insecticide can be any of the wide variety of insecticides now known, including lindane, chlordane and the like. While materials such as benene hexachloride are sometimes suitable, it is normally desired to use the purified, odorless, and more insecticidally potent lindane for this purpose. Mixtures of insecticides are frequently employed. Thus, quantities of pyrethrums (containing a suitable synergist) having a high "knockdown" value can be combined with lindane, for example, which has a greater residual insecticidal action. Additional insecticides suitable for this invention are parathion, toxaphene, DDT, methoxychlor, heptachlor, aldrin, dieldrin, and paradichlorobenzene.

The adhesive composition is not critical except that it provide a sufficient bonding action to hold the insecticide carrier to the blades under the centrifugal forces normally generated by rotation of the fan blades. Preferably, the adhesive is of the well known pressure sensitive type.

While the insecticide carrier disclosed herein and illustrated in the drawings is preferred, the insecticide can be secured to a carrier permanently mounted on the blades, or in some cases can be applied directly to the fan blades. In the latter case, a pocket or recess can be provided on the fan blades to aid in holding the insecticide in position during operation of the fan. The improved insecticide dispenser of this invention has many outstanding advantages over prior dispensers. It is adapted to employ solid, preferably pure, insecticide, thus eliminating the disagreeable odor, toxicity, and other undesirable characteristics of common solvents. Also, the insecticide dispenser of this invention results in an obvious major economy over prior devices, not only of the cost of the solvent itself but of the cost of containers, processing, and the like previously necessary with solvent-type sprays and insecticide bombs. The insecticide vapors are intimately and uniformly mixed with relatively large volumes of air, thus assuring complete distribution of the insecticide throughout the room or other space to be treated, and insuring against dangerous, toxic concentrations in any isolated area of the room. The dispenser of this invention is particularly suitable for use in cattle and dairy barns and for industrial applications.

I claim:

1. An insecticide carrier adapted to be affixed to the blades of a fan comprising a flexible backing member, an adhesive coating on one side of said backing member, and a solid vaporizable insecticide secured to the opposite side of said backing member.

2. An insecticide carrier according to claim 1, wherein said flexible backing member is a porous sheet and said solid insecticide is embedded in the surface thereof.

3. The insecticide carrier of claim 1 wherein the insecticide is lindane.

4. The insecticide carrier of claim 1 wherein the insecticide is chlordane.

5. The insecticide carrier of claim 1 wherein the insecticide is DDT.

6. The insecticide carrier of claim 1 wherein the insecticide is paradichlorobenzene.

References Cited in the file of this patent

UNITED STATES PATENTS

| | | |
|---|---|---|
| 649,826 | Eldred | May 15, 1900 |
| 712,177 | Bradshaw | Oct. 28, 1902 |
| 725,086 | Jacobs | Apr. 14, 1903 |
| 1,066,851 | Siefert | July 8, 1913 |
| 1,080,716 | Rand | Dec. 9, 1913 |
| 2,050,773 | Wall | Aug. 11, 1936 |
| 2,545,160 | Miller | Mar. 15, 1951 |

FOREIGN PATENTS

| | | |
|---|---|---|
| 3,170 | Great Britain | of 1880 |